United States Patent [19]
Ishiwa

[11] Patent Number: 4,758,198
[45] Date of Patent: Jul. 19, 1988

[54] GAS-INFLATABLE TOY WITH PLURAL BLADDERS AND VALVE MEANS

[75] Inventor: Takuzo Ishiwa, Tokyo, Japan

[73] Assignee: Ringstone Co., Ltd., Tokyo, Japan

[21] Appl. No.: 945,860

[22] Filed: Dec. 23, 1986

[30] Foreign Application Priority Data

Sep. 18, 1986 [JP] Japan .............................. 61-143176[U]
Sep. 18, 1986 [JP] Japan .............................. 61-143177[U]
Oct. 28, 1986 [JP] Japan .............................. 61-165343[U]

[51] Int. Cl.⁴ .......................... A63H 3/06; F16K 15/16
[52] U.S. Cl. ..................................... 446/220; 446/224; 446/226; 137/512; 137/846
[58] Field of Search ................. 446/14, 220, 224, 226; 206/219, 221; 220/85 B; 137/512, 846

[56] References Cited

U.S. PATENT DOCUMENTS

| | | | |
|---|---|---|---|
| 953,168 | 3/1910 | Hamilton | 446/220 |
| 1,008,641 | 11/1911 | Gregory | 446/224 |
| 1,630,040 | 5/1927 | Vogt et al. | 137/846 X |
| 1,713,751 | 5/1929 | Dorogi et al. | 446/220 |
| 1,881,048 | 10/1932 | Dorogi et al. | 446/220 |
| 1,901,150 | 3/1933 | Dorogi et al. | 446/226 |
| 2,470,990 | 5/1949 | Kennedy | 446/220 |
| 3,091,053 | 5/1963 | Growald | 446/14 |
| 3,133,696 | 5/1964 | Mirando | 137/846 X |
| 3,523,563 | 8/1970 | Mirando | 446/226 |
| 3,664,058 | 5/1972 | Brieske | 446/224 |
| 3,822,720 | 7/1974 | Souza | 137/846 |
| 4,259,805 | 4/1981 | Hornsby | 446/198 |
| 4,393,867 | 7/1983 | Baron | 446/220 |
| 4,674,532 | 6/1987 | Koyanagi | 446/224 X |

FOREIGN PATENT DOCUMENTS

| | | | |
|---|---|---|---|
| 1375573 | 9/1964 | France | 446/226 |
| 1380732 | 10/1964 | France | 446/226 |
| 483395 | 11/1954 | Italy | 446/226 |
| 52-44160 | 10/1977 | Japan . | |
| 54-12595 | 1/1979 | Japan . | |
| 680192 | 10/1952 | United Kingdom | 446/224 |
| 941546 | 11/1963 | United Kingdom | 446/226 |
| 2061121 | 5/1981 | United Kingdom | 446/226 |

*Primary Examiner*—Robert A. Hafer
*Assistant Examiner*—Charles H. Harris
*Attorney, Agent, or Firm*—Young & Thompson

[57] ABSTRACT

A gas-inflatable bladder toy is disclosed, in which a plurality of films are stacked with their peripheral edges being sealed for forming a bladder to be inflated by filling a required pressure gas therein, said bladder being adapted to be fed with an external gas and provided with an air valve in a flat double cylindrical form for checking an internal gas, or alternatively in which the same construction of the bladder contains a plurality of receiving bags separately receiving certain foaming agents which are chemically reacted upon mixing to produce a gas, these filling bags being broken by an external force. In accordance with the gas-inflatable bladder toy of the invention, the shape of the receiving body containing the preexpanded bladder 1 may be quite different from the shape of the expanded bladder 1 after opening the receiving body 7 and expanding to the given shape, thereby to provide an exciting bladder toy with a surprising effect. The dynamic change in appearance during the expansion of the bladder from breakage of the receiving body to the given shape of, for example, a monster is very exciting and amusing.

4 Claims, 4 Drawing Sheets

GAS-INFLATABLE TOY WITH PLURAL BLADDERS AND VALVE MEANS

FIELD OF THE INVENTION

This invention relates to a gas-inflatable bladder toy which is inflatable with an external gas introduced thereinto through an air valve of a flat double-cylindrical form or is expandable by means of a gas produced from foaming agents contained in the bladder, which is suitably made of a film material, such as nylon or polyethylene, and is very convenient for compact storage, and which is variable in appearance before and after inflation of the bladder with a dynamic change during the inflation.

BACKGROUND OF THE INVENTION

A conventional bladder toy has been formed by preparing a bladder Q of a desired shape from, for example, a vinyl material and attaching an air valve P of a flexible plastics to the bladder Q at its air-blow opening, as shown in FIG. 1. The air valve P has been formed, on the other hand, by withdrawing a blow cylinder 20 out of a cylinder 10 bonded to the air-blow opening of the bladder Q and inserting a sealing plug 30 into an opening of the blow cylinder 20, which sealing plug 30 is connected to the blow cylinder 20 by means of a connecting piece 40.

Generally, the conventional bladder toy is played with in its inflated state after blowing a gas, such as an air, into the bladder of a vinyl material. For example, Japanese Laid-open U.M. Application No. 12595/79 discloses a flying toy which is played with in its expanded state with the fingers after introduction of air into the bladder of a disc shape.

Japanese U.M. Publication No. 44160/77, on the other hand, discloses a block toy which comprises a combination of cylindrical bodies for retaining their rod shape with inflating air and a connecting body for connection of the cylindrical bodies also with inflating air.

In the conventional bladder toys provided with the air valve P as described above, however, a higher load is applied to an adhesive portion between the bonded cylinder 10 of the air valve P and the air blow opening of the bladder Q. For this reason, the material of the bladder must be resistant to high loads, and thus a thick sheet material of vinyl has been preferably utilized. A thin film material of polyethylene or nylon, on the contrary, has been considered unsuitable for the bladder. Consequently, the conventional bladder toy is very bulky when folded for storage, and especially protrusion of the air valve (or a plug) P from the bladder body Q hinders storage.

Furthermore, the air valve P must be prepared separately from the bladder and subsequently bonded to the latter. As a result, the higher cost of providing the air valve P raises the production cost of the bladder toy.

The typical bladder toy as described above, on the other hand, must be played with only after its expansion or inflation, resulting in necessity of waiting for the expansion to take place to a given shape without any amusement and thus reduction in value as a toy.

Accordingly, an object of the invention is to provide a gas inflatable bladder toy at a low cost, which may be made of a thin film material, such as polyethylene or nylon, and may be sealed more efficiently and stored more compactly, and which may provide an interesting dynamic expansion or inflation procedure from an initial collapsed state through expansion of the bladder with the gas to an inflated state of a given shape. The larger the difference of shape before and after the expansion, the greater the amusement.

SUMMARY OF THE INVENTION

Accordingly, one aspect of the invention provides a gas-inflatable bladder toy, in which a plurality of films are stacked with their peripheral edges sealed for forming a bladder to be inflated by filling a required pressure gas therein, said bladder being adapted to be fed with an external gas and provided with an air valve in a flat double-cylindrical form for checking an internal gas, said air valve being fixed to a portion of the bladder.

Another aspect of the invention provides a gas-inflatable bladder toy, in which a plurality of films are stacked with their peripheral edges sealed for forming a bladder to be inflated by filling a required pressure gas therein, said bladder containing a plurality of receiving bags separately receiving foaming agents which are chemically reacted upon mixing to produce a gas, said receiving bags being broken by an external force.

In accordance with the invention, the bladder is formed of a plurality of stacked film sheets which are bonded at their periphery to provide a seal.

The flat and substantially double-cylindrical air valve is arranged at an inner side of the periphery of the stacked sheet bladder, so that the peripheral edge of the bladder and both longitudinal side edges of the air valve may be stacked at the bonded portion.

In an embodiment utilizing an air valve, a gas introduced into the bladder through the air valve flows back externally out of the bladder through an opening of the air valve when the bladder is completely filled with the gas to increase its inner pressure. At this point a check valve in the air valve is pressed to close the opening of the air valve.

In another embodiment, the foaming agents are mixed within the sealed bladder to produce a gas for expanding the bladder. The bladder with its expanding pressure allows a receiving body to open and continues the expansion to form a given shape outside of the receiving body.

The invention will be described herein-below in more detail as to its preferred embodiments with reference to the accompanying drawings.

BRIEF DESCRIPTION OF THE DRAWINGS

FIGS. 2 to 6 illustrate one embodiment of the bladder toy with foaming agents therein, in which FIG. 2 is a perspective view of the bladder toy in its usable condition;

FIG. 4 is a sectional view of the bladder toy in its received condition within a receiving body;

FIG. 5 is a perspective view of the bladder toy during its expansion from a receiving body;

FIG. 6 is a perspective view of the bladder toy in its expanded state to a given shape;

FIGS. 7 to 10 illustrate another embodiment of the bladder toy having an air valve, in which FIG. 7 is its sectional view;

FIG. 8 is a perspective view of the bladder toy in its expanded state to a given shape;

FIG. 9 is an enlarged perspective view of the air valve;

FIG. 10 is a sectional view of the air valve; and

PREFERRED EMBODIMENTS OF THE INVENTION

Figure 1:
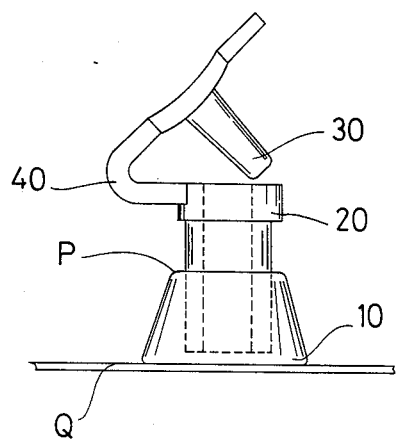
FIG. 1 is a front view of a conventional air valve.
Figure 2:
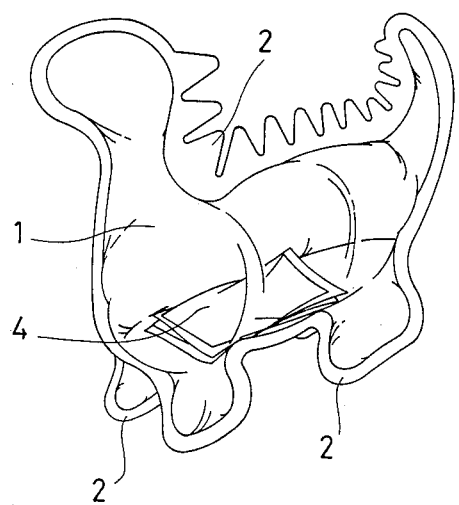
Figure 3A:
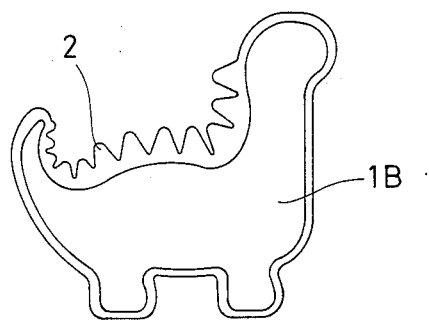
FIGS. 3A, 3B and 3C show development of the bladder toy.
Figure 3B:
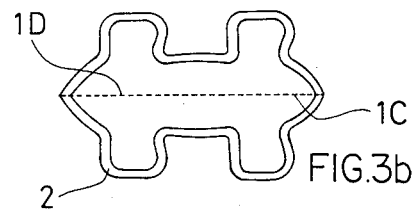
Figure 3C:
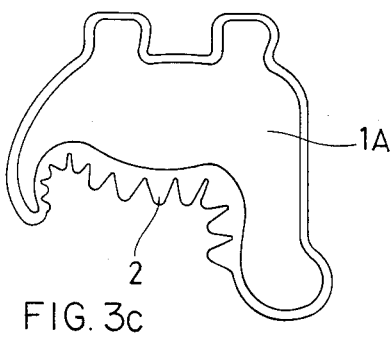
Figure 11:
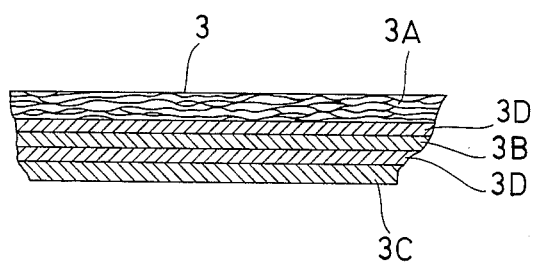
FIG. 11 is an enlarged sectional view of stacked film materials forming the bladder according to the invention.

FIG. 2 illustrates one embodiment of the invention, in which reference 1 represents a bladder forming a desired toy. The bladder 1 is formed by stacking a suitable number of films 3, as best shown in FIG. 11, and bonding their peripheral edges. As shown in FIG. 3, the bladder 1 of an animal shape is formed of a right side piece 1A, a left side piece 1B and a gore piece 1C. The bladder 1 is not limited to the animal shape but any other shape may be provided, such as characters, buildings and others. In this case, the gore piece 1C enables the bladder 1 to be readily formed in three dimensions. Alternatively, the bladder 1 may be formed by folding a single piece of the film 3 and bonding the folded edge.

The film material is not limited to nylon, polyethylene or synthetic resins but may be of a fibrous film or paper. A plurality of such films 3 may be stacked to form the bladder 1 having a higher bonding strength and an excellent sealing effect. As shown in FIG. 11, for example, a laminate structure may be formed by stacking an outer later 3A of a Kraft paper or fibrous film, an intermediate layer 3B of a nylon film and an inner layer 3C of a polyethylene film with intervening binder layers 3D to form a tough film material 3 having a high sealing effect. Alternatively (not shown), the outer layer 3A of a Kraft paper on its inner surface is laminated with a polyethylene film to form a film material 3 particularly suitable for heat sealing. Of course, a mono-layer structure of the film material may be used.

Figure 7:
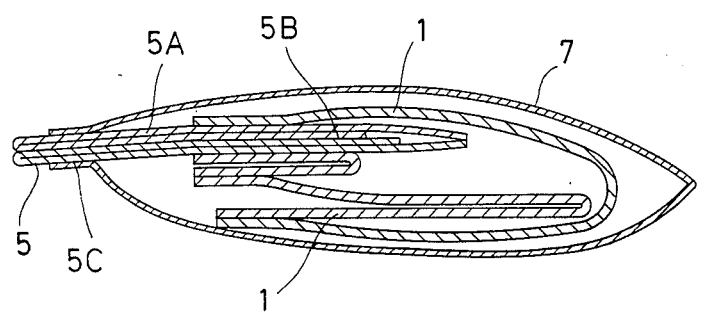
Figure 8:
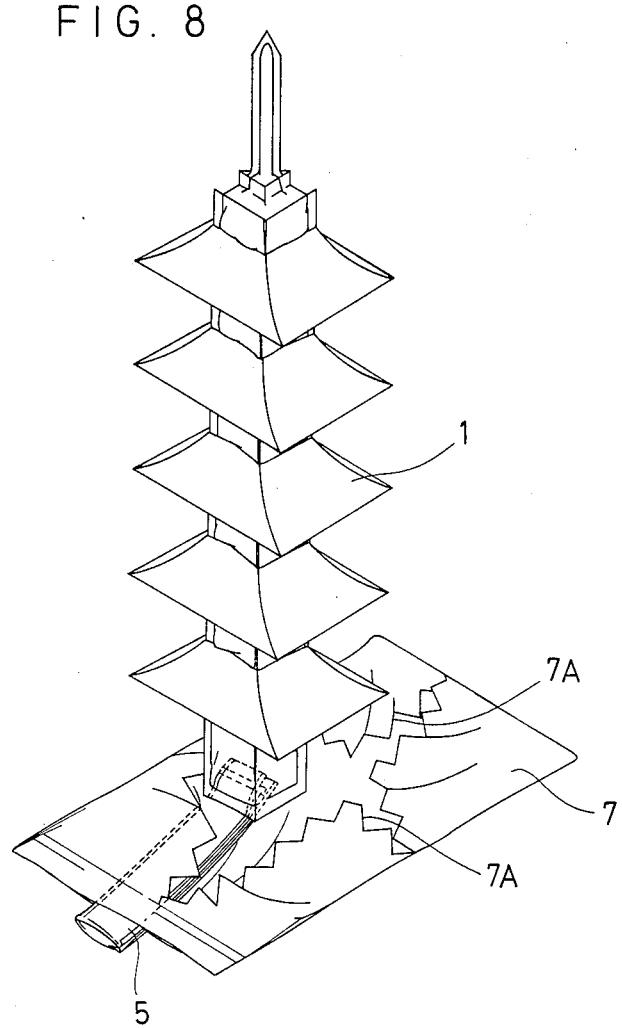
Figure 9:
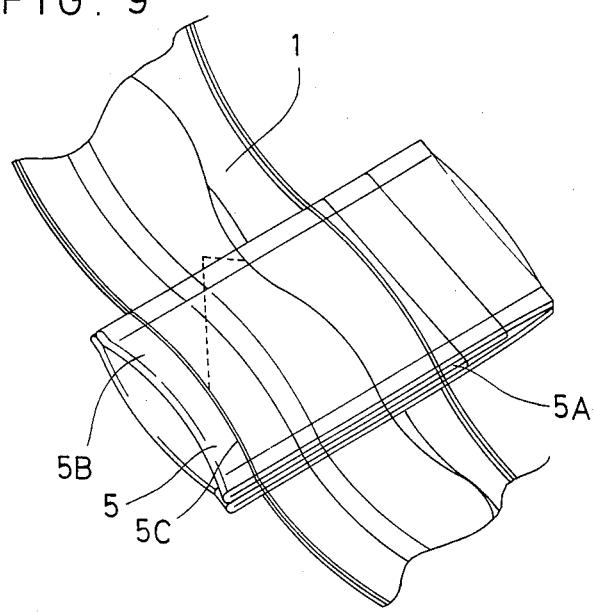

FIG. 8 illustrates another embodiment of the invention, in which reference 5 represents an air valve for blowing a gas, such as air, into the bladder 1. The air valve 5 is formed by stacking a pair of rectangular pieces folded about a fold line transverse to their length and bonding both longitudinal side edges, as shown in FIGS. 7, 9 and 11. The air valve 5 is in the form of a flat double-cylinder containing therein check valves 5A, one of which may be made longer than the other to increase the sealing strength.

The air valve 5 at its outer face is bonded to an inner face of the peripheral edge of the bladder to be stacked and bonded. The bonding of the air valve to the bladder 1 may be conveniently achieved by heat sealing. The same material of the air valve 5 as that of the bladder 1 may enhance the bonding effect considerably and permits simultaneous heat sealing procedures for the peripheral edge of the bladder 1 on the one hand and for the air valve 5 to the bladder 1 on the other hand, resulting in a convenient production process. Of course, the material for the air valve 5 may be different from that of the bladder 1, while any other bonding means, such as an adhesive, may be utilized for bonding the air valve 5 to the bladder 1.

Figure 10:
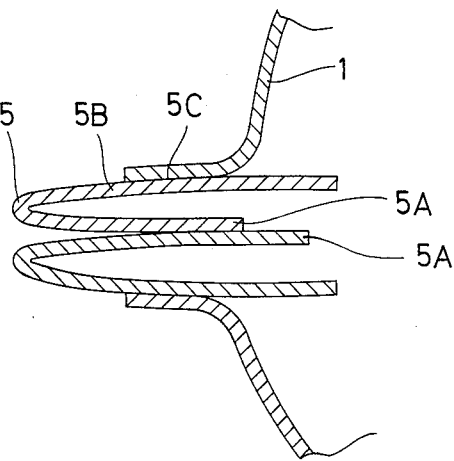

In FIGS. 7, 9 and 10, a blowing cylinder of the air valve is shown by reference 5B.

Figure 4:
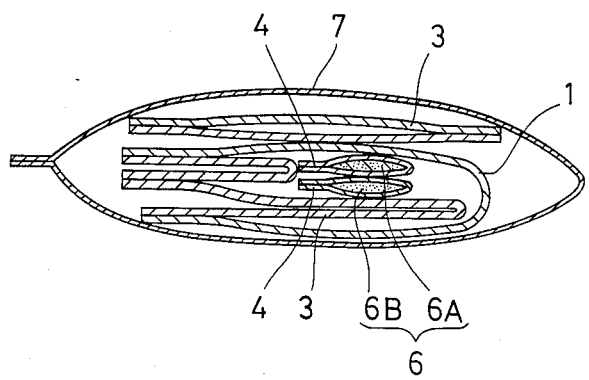

In the embodiment of FIG. 4, reference 4 stands for a receiving bag to be filled with certain foaming agents 6 consisting of a principal agent 6A and a subsidiary agent 6B which may be reacted chemically with each other to produce a gas. Each of these agents 6A and 6B may be received separately in each receiving bag 4 which is readily openable. As the foaming agents, there may be used sodium bicarbonate for the principal agent 6A while citric acid may be utilized for the subsidiary agent 6B for producing a non-toxic gas of carbon dioxide which has a very safe expanding effect. The foaming agents, however, are not limited thereto but may be of any type. In the illustrated embodiment, a folded sheet at its peripheral edge is thermally sealed to form each flat receiving bag 4 for receiving the principal or subsidiary agent separately. The receiving bag 4 at its bulged portion is forcibly pushed by the fingers to open the thermally sealed portion. Alternatively, there may be provided a single receiving bag 4 which includes a plurality of receiving portions containing the principal agent 6A and the subsidiary agent 6B separately.

Figure 5:
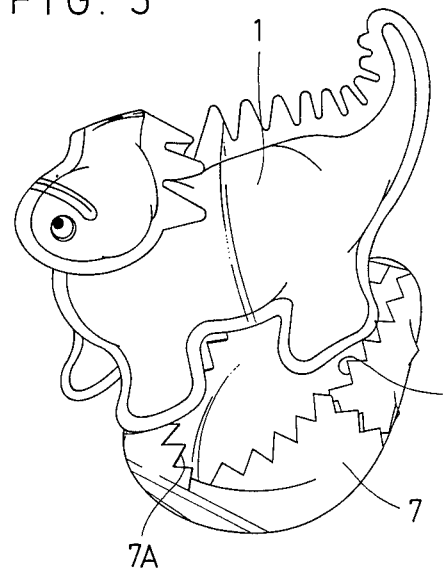
Figure 6:
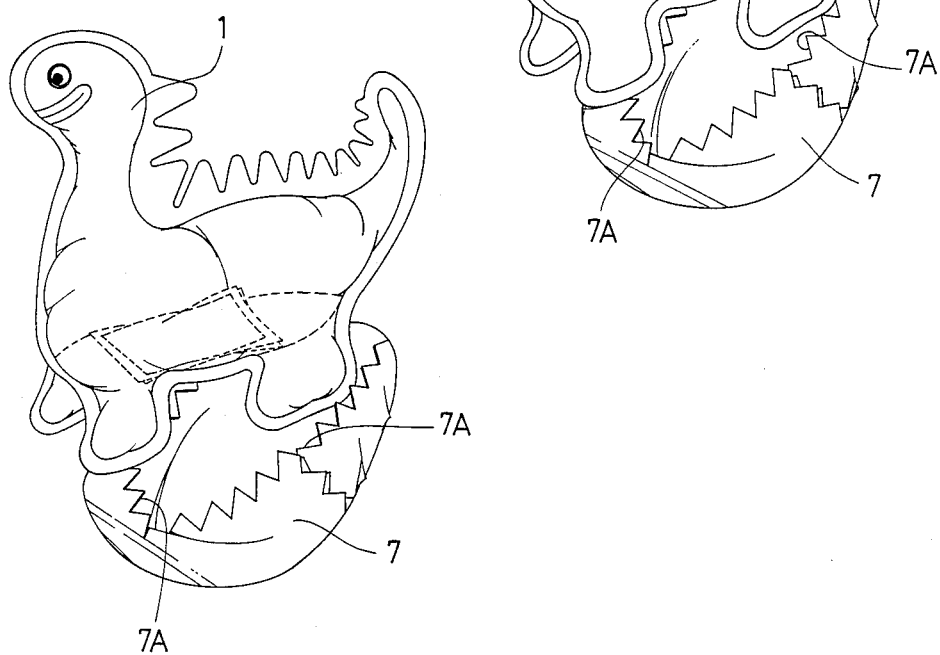

The bladder 1 thus constructed may be accommodated in its non-expanded state within a receiving body 7 which may be readily openable with an expanding pressure of the bladder 1. The receiving body 7, as shown in FIGS. 4 to 6, is formed of a material, such as polyethylene, in an egg shape which receives therein the bladder 1 of a monster shape. In order to achieve ready opening and simulate an actual egg, the receiving body 7 at a suitable position is provided with an opening 7A in the form of a crack.

In the embodiment of FIG. 8, the bladder 1 of a five-storied pagoda is received in a flat rectangular receiving body 7 which is also provided with an opening 7A of a crack shape.

In operation of the bladder 1 thus accommodated in the receiving body 7, at first the bladder 1 is filled with a gas and allowed to continue its expansion to its given shape even after the receiving body 7 at its opening 7A has been opened with an expanding pressure of the bladder 1. In the embodiment using the air valve 5, the gas may be removed from the bladder 1, so that the bladder toy may be played with repeatedly in many times. In the embodiment utilizing the foaming agents 6, on the other hand, the bladder 1 may be finally burst with the continued expansion for a surprising effect.

In accordance with the invention, the suitable number of the films 3 are stacked and bonded at their peripheral edges to form the bladder 1, while a pair of the longitudinally folded rectangular pieces are stacked and bonded at both longitudinal side edges to form the flat double-cylindrical air valve 5 having therein the check valve 5A. By bonding the outer surface of the air valve 5 to the peripheral inner edge face of the bladder 1, even the thin film material 3 of polyethylene or nylon may be resistant to the attachment of the air valve 5 (see FIGS. 7 to 10).

Since the outer surface of the air valve 5 is bonded to the peripheral inner edge of the bladder 1, the bonding procedure therefor may be very convenient while the bonded portion between the number of stacked films of the air valve 5 and the bladder 1 may have a high strength and an excellent sealing effect.

Since the air valve 5 is formed foldably by stacking a pair of the rectangular pieces and bonded at the longitudinal side edges, the air valve 5 has a thickness equal to the stacked rectangular pieces when the degassed bladder 1 is folded. Thus, in comparison with the conventional cylindrical air valve P provided protruding from the bladder Q, the air valve 5 according to the invention may be less bulky upon storage, thereby to permit very compact handling together with the thin film material 3 of the bladder 1.

Since the air valve 5 according to the invention is not provided with the blow cylinder 20 having the sealing plug 30 and the connecting piece 40 as in the conventional air valve P, the air valve 5 may be inserted into the bladder 1, resulting in a good appearance without protrusion of the air valve outside.

Further, the bladder toy according to the invention is made of a material, such as polyethylene or nylon of low cost, so that it may be commercially available at a very low cost and thus may be utilized as a premium good for advertising or formed as a disposable toy.

Alternatively, the bladder toy according to the invention may be formed of the bladder 1 as described for the previous embodiment and the openable receiving bags 4 containing therein the foaming agents 6 separately which produce a gas when mixed within the bladder 1. In this embodiment, the gas produced from the foaming agents may expand the bladder 1 without arranging the air valve and blowing an external gas therethrough into the bladder (see, FIGS. 4 to 6).

Thus, various film materials may be utilized for ensuring a sealing condition only by bonding the stacked films at the peripheral edges, so that a bladder of low cost and excellent sealability may be obtained. As in the previous embodiment, the bladder is not provided with the air valve P with the air plug 30 and the connecting piece 40, thereby to permit compact storage when not used.

Further, the bladder 1 may be expanded by the gas resulting from chemical reaction of the foaming agents 6 contained in the bladder 1, thereby to provide a different type of the interesting bladder toy from the conventional one utilizing the air valve or air plug.

Still further, the self-expandable bladder 1 with the pressure of the produced gas may be received in the receiving body 7 which is openable with the pressure of the expanding bladder 1, so that the shape of the receiving body containing the pre-expanded bladder 1 may be quite different from the shape of the expanded bladder 1 after opening the receiving body 7 and expanding to the given shape, thereby to provide an exciting bladder toy with a surprising effect. The dynamic change in appearance during the expansion of the bladder from breakage of the receiving body to the given shape of, for example, a monster is very exciting and amusing.

Thus, in accordance with a invention, the gas inflatable bladder toy may be provided at a low cost, which may be made of a thin film material, such as polyethylene or nylon, and may be sealed more efficiently and handled more compactly, and which may provide an interesting dynamic expansion or inflation procedure from an initial collapsed state through expansion of the bladder with the gas to an inflated state of a given shape. The larger the difference of shape before and after the expansion, the greater becomes the amusement.

What is claimed is:

1. A gas-inflatable bladder toy, comprising a pair of flexible sealed inflatable bladders disposed one within the other, the inner bladder having an inflated volume greater than that of the outer bladder, and the inner bladder containing a plurality of foaming agents which chemically react upon mixing to produce a gas, rupturable means separating said foaming agents from each other, said separatng means being adapted to be ruptured by manipulation of the inner and outer bladders by a user to mix the foaming agents, whereupon the two bladders expand together until the outer bladder is fully inflated, whereafter continued foaming of the foaming agents causes the inner bladder to rupture the outer bladder and to continue to expand externally of the ruptured outer bladder to a volume greater than that of the fully inflated outer bladder.

2. A gas-inflatable bladder toy as claimed in claim 1, in which said foaming agents are sodium bicarbonate and citric acid.

3. A gas-inflatable bladder toy, comprising a plurality of flexible films stacked with their peripheral edges sealed to form a bladder to be inflated by filling the bladder with a gas under pressure from an external source, said bladder having an air valve extending between said sealed peripheral edges and being sealed to said peripheral edges, said air valve being in the form of two elongated strips of flexible material that have been bent about a line transverse to their length, the two bent strips being then sealed together only along their longitudinal edges to provide an air valve presenting externally two parallel juxtaposed folded edges defining between them a passageway through which gas can be introduced, and four free ends of the two strips disposed internally of the bladder and past which gas flow toward the exterior of the bladder is prevented by contact with each other of the strip ends on opposite sides of said passageway.

4. A gas-inflatable bladder toy as claimed in claim 3, in which the two layers of the two different strips that are against each other to define said passageway extend a lesser distance within the bladder than do the layers of said strips which are opposite each other.

* * * * *